US009047097B2

United States Patent
Cabillic et al.

(10) Patent No.: US 9,047,097 B2
(45) Date of Patent: Jun. 2, 2015

(54) METHOD FOR PROVIDING AN APPLICATION AS A LIBRARY IN A VIRTUAL MACHINE

(75) Inventors: Gilbert Cabillic, Brece (FR); Jean-Philippe Lesot, Argentre du Plessis (FR)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/992,140

(22) PCT Filed: Dec. 6, 2011

(86) PCT No.: PCT/EP2011/071981
§ 371 (c)(1),
(2), (4) Date: Nov. 21, 2013

(87) PCT Pub. No.: WO2012/076556
PCT Pub. Date: Jun. 14, 2012

(65) Prior Publication Data
US 2014/0089907 A1    Mar. 27, 2014

(30) Foreign Application Priority Data
Dec. 6, 2010   (FR) ...................................... 10 60148

(51) Int. Cl.
*G06F 9/45*   (2006.01)
*G06F 9/54*   (2006.01)

(52) U.S. Cl.
CPC . *G06F 8/41* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,408,665 A | 4/1995 | Fitzgerald | |
| 6,066,181 A | 5/2000 | Demaster | |
| 6,223,335 B1 * | 4/2001 | Cartwright et al. | 717/100 |
| 6,523,168 B1 * | 2/2003 | Arnold et al. | 717/116 |
| 6,691,301 B2 * | 2/2004 | Bowen | 717/114 |
| 6,820,252 B2 * | 11/2004 | Sakamoto et al. | 717/136 |
| 6,834,391 B2 * | 12/2004 | Czajkowski et al. | 719/328 |
| 2003/0033588 A1 * | 2/2003 | Alexander | 717/107 |
| 2003/0051233 A1 | 3/2003 | Krishna et al. | |
| 2003/0101438 A1 * | 5/2003 | Mishra et al. | 717/136 |
| 2004/0103405 A1 * | 5/2004 | Vargas | 717/137 |
| 2005/0080813 A1 * | 4/2005 | Shi et al. | 707/103 R |
| 2006/0136712 A1 * | 6/2006 | Nagendra et al. | 713/150 |
| 2006/0184919 A1 | 8/2006 | Chen et al. | |
| 2007/0136719 A1 | 6/2007 | Lagergren | |
| 2008/0127120 A1 * | 5/2008 | Kosche et al. | 717/131 |
| 2008/0172657 A1 * | 7/2008 | Bensal et al. | 717/136 |
| 2008/0216063 A1 | 9/2008 | Krasnoiarov | |
| 2009/0254923 A1 * | 10/2009 | Newport et al. | 719/318 |
| 2010/0153776 A1 * | 6/2010 | Vick et al. | 714/15 |
| 2010/0242015 A1 * | 9/2010 | Stenberg et al. | 717/106 |
| 2011/0010715 A1 * | 1/2011 | Papakipos et al. | 718/100 |

(Continued)

OTHER PUBLICATIONS

International Search Report prepared by the European Patent Office in International Application No. PCT/EP2011/071981, completed Mar. 2, 2012.

*Primary Examiner* — Chameli Das
(74) *Attorney, Agent, or Firm* — McDonnell Boehnen Hulbert & Berghoff LLP

(57) ABSTRACT

A method for providing an application by a virtual machine. The method includes a step of compiling an application written in a source code to a native application for a particular platform and a step of transforming the compiled application into a library, wherein the library is made available to the virtual machine.

20 Claims, 2 Drawing Sheets

(56) References Cited

U.S. PATENT DOCUMENTS

2011/0055527 A1* 3/2011 Klein ............................ 712/226
2011/0283269 A1* 11/2011 Gass et al. .................... 717/168
2011/0314452 A1* 12/2011 Tillmann ...................... 717/128
2012/0042145 A1* 2/2012 Sehr et al. .................... 711/163

* cited by examiner

METHOD FOR PROVIDING AN APPLICATION AS A LIBRARY IN A VIRTUAL MACHINE

CROSS-REFERENCE TO RELATED APPLICATIONS

This Application is a Section 371 National Stage Application of International Application No. PCT/EP2011/071981, filed Dec. 6, 2011, which is incorporated by reference in its entirety and published as WO 2012/076556 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The invention pertains to the compilation and management of the compilation of applications to be implemented on a communications terminal. A communications terminal may be a computer, a telephone, a programmable personal assistant, etc.

PRIOR-ART SOLUTIONS

As a rule, applications are compiled natively in binary languages supported by the terminal, i.e. compiled in the form of an intermediate code and then executed by a virtual machine. This possibility is at times acknowledged by some as not being completely optimal despite the use of compilation techniques before execution of the program (i.e. AOT or "ahead of time" techniques) or during its execution (JIT or "just in time", or DAC or "dynamic adaptive compiler"). Indeed, these techniques raise problems in environments where the computation power and the available resources are small. Furthermore, these last-named compiler-based techniques are integrated into the virtual machine itself.

Apart from these techniques, there is little latitude to enable optimized implementation of an application using a virtual machine.

SUMMARY OF THE INVENTION

An aspect of the present application pertains to a method for making available an application by means of a virtual machine. According to the invention, such a method comprises a step for compiling an application written in a source code or an intermediate code into a native application for a considered platform and a step for converting said compiled native application into a library, said library being made available to said virtual machine.

Thus, the application can be used transparently by the virtual machine using appropriate interfaces while at the same time preserving the optimizations achieved during the compilation into native code. It is thus not obligatory to modify the implementation of the virtual machine or the application. Indeed, the invention makes it possible not to break the virtual machine or the application. The technique of the invention is transparent.

According to a preferred implementation, the different steps of the method according to the invention are implemented by a software program or computer program, this software program comprising software instructions that are to be executed by a data processor of a relay module according to the invention and are designed to command the execution of the different steps of this method.

Consequently, the invention also pertains to a program capable of being executed by a computer or by a data processor, this program comprising instructions to command the execution of the steps of a method as mentioned here above.

This program can use any programming language whatsoever and be in the form of source code, object code or intermediate code between source code and object code such as in partially compiled form or in any other desirable form.

The invention also seeks to obtain an information carrier readable by a data processor and comprising instructions of a program as mentioned here above.

The information carrier can be any entity or device whatsoever capable of storing the program. For example, the carrier may comprise a storage means such as a ROM, for example a CD ROM or a microelectronic circuit ROM or again a magnetic recording means, for example a floppy disk or a hard disk drive.

Besides, the information carrier can be a transmissible carrier such as an electrical or optical signal that can be conveyed through an electrical or optical cable, by radio or by other means. The program according to the invention can especially be downloaded on an Internet type network.

As an alternative, the information carrier can be an integrated circuit in which the program is incorporated, the circuit being adapted to execute the method in question or to be used in the execution of the method in question.

According to one embodiment, the invention is implemented by means of software and/or hardware components. From this point of view, the term "module" may correspond in this document equally well to a software component and to a hardware component or to a set of hardware and software components.

A software component corresponds to one or more computer programs, one or more sub-programs of a program or more generally to any element of a program or a software program capable of implementing a function or a set of functions according to what is described here below for the module concerned. A software component of this kind is executed by a data processor of a physical entity (a terminal, a server, etc) and is capable of accessing the hardware resources of this physical entity (memories, recording media, communications buses, electronic input/output boards, user interfaces, etc).

In the same way, a hardware component corresponds to any element of a hardware unit capable of implementing a function or a set of functions according to what is described here below for the module concerned. It can be a programmable hardware component or a component with integrated processor for the execution of software, for example an integrated circuit, a smartcard, a memory card, an electronic board for executing firmware, etc.

LIST OF FIGURES

Other features and advantages of the invention shall appear more clearly from the following description of a preferred embodiment, given by way of a simple illustratory and non-exhaustive example and from the appended drawings, of which:

Figure 3:
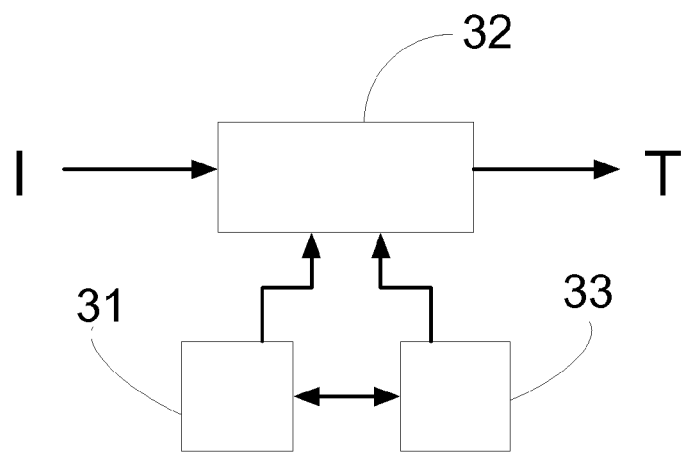

FIG. 3 describes a device for making available according to the invention.

DETAILED DESCRIPTION OF THE INVENTION

1. Reminder of the Principle of the Invention

The general principle of the invention, as already explained, consists in accelerating an application which is initially an application that gets executed by means of a virtual machine (hence an application that can generally suffer problems of performance) by converting this application into a native library, i.e. a library written in machine language or binary language which is therefore directly understandable by the machine. Unlike in other prior-art techniques, what has to be done is not to make a compilation in real time at the time of use of the application but to offer a library complementary to the application installed at the same time as the application. This technique can be implemented in all operating systems that use a virtual machine. This technique can more particularly be implemented with Java™ applications on the Windows™ or Linux™ operating systems.

Figure 1:
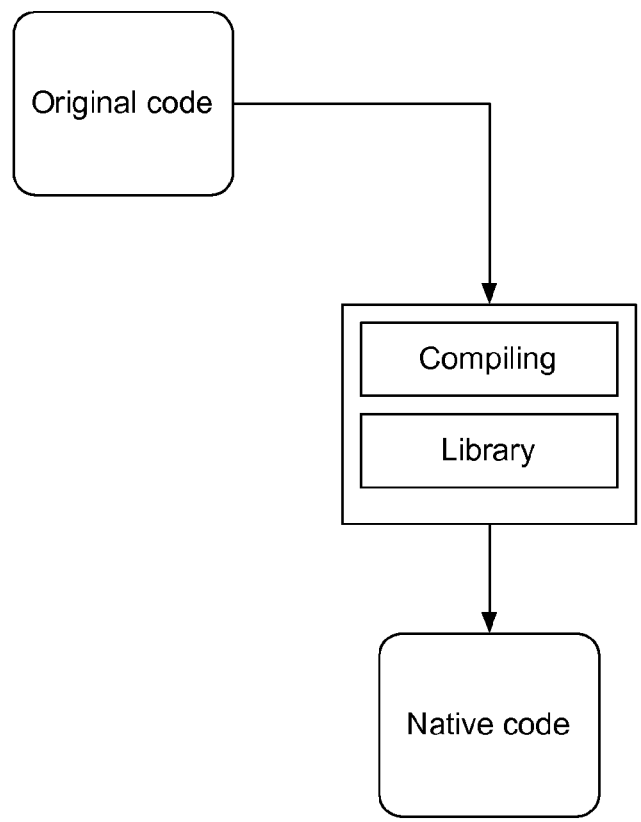
FIG. 1 is a block diagram of the method of the invention.

The principle of the invention is described with reference to FIG. 1.

To this end, the invention comprises a step of compiling the application (whether it is in source code or in intermediate code) into a native application (i.e. an application that comprises code instructions proper to the system on which it is executed). According to one particular characteristic, it is not necessary for the entire application to be compiled in native language but it can happen that only some modules are compiled in this way (these are for example modules that have the greatest problems of performance).

The invention also comprises a step for converting said compiled native application into a library, said library being made available to said virtual machine. During the above-mentioned steps and, more particularly, during the compilation step, particular data structures are managed. These particular data structures make it possible to set up the interface between the functions of the application and the functions of the virtual machine and provide for overall transparent functioning.

Figure 2:
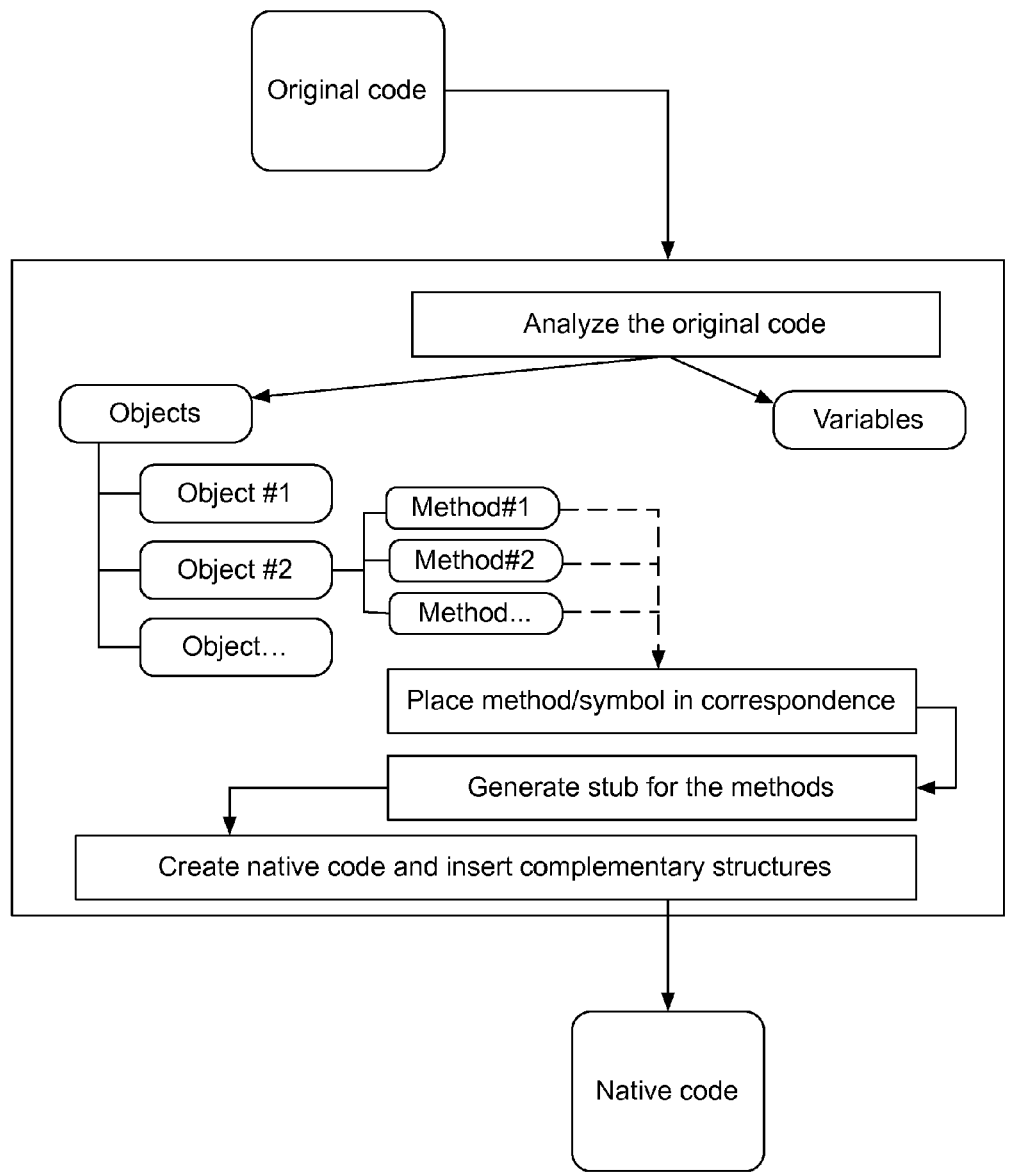
FIG. 2 illustrates the different steps that take place during the compilation, according to one embodiment of the invention.

Referring to FIG. 2, a description is given of the various steps that take place during the compilation step in one embodiment of the invention.

The compilation step which delivers the native code of the application comprises, in other steps:

a step for analyzing said original code of said application, delivering at least one set of objects of said application and at least one set of variables of said application, an object of said set of objects comprising at least one associated method;

a step for placing at least one method of an object of said set of objects in correspondence with a corresponding symbol in a native code of said native application, as a function of said set of objects;

a step for generating a function stub for each method to be compiled, according to said set of objects;

a step for creating said native application according to said placing in correspondence and said generation of said stub.

This last step of creating native code is done by inserting, into the native code, in addition to the result of the compilation from original code to native code, the data structures and the native code needed to put methods and symbols into correspondence and the execution stubs.

Other data structures and other native codes, for example related to the variables, the exceptions and to the garbage collector, etc, are also inserted depending on the nature of the code and the nature of the interaction with the virtual machine.

Referring to FIG. 3, an embodiment is now presented of a device for making available according to the invention.

FIG. 3 is a simplified view of a device for making available according to the invention.

For example, the device for making available comprises a memory 31 constituted by a buffer memory, a processing unit 32, equipped for example with a microprocessor and a random-access memory, and driven by the computer program 32, implementing a program for making available according to the invention.

At initialization, the computer program code instructions 33 are for example loaded into a memory and then executed by the processor of the processing unit 32.

The microprocessor, the random-access memory, the computer program work together and form the means for making available according to the method of the invention in this embodiment. In other embodiments, specific hardware processing modules can be implemented to apply the invention.

In one particular embodiment, we present the implementation of the invention applied to the Android™ environment as well as the virtual machine Dalvik™. The sections that follow describe an implementation of this kind. Naturally, the set of techniques since described here below is implemented in other types of environment based on virtual machines and intermediate codes.

2. Description of One Particular Embodiment

As already explained, the invention has a technology that can be used to accelerate an application, a library, a service or any other program executed on a platform such as Android™ (here below, we shall use the generic term "Application").

The technology resulting from the invention can take the form of a computer program executable by an Android™ platform linked with a virtual machine. This executable computer program is here below called a "Library". This library is formed by a "Runtime" part responsible for interfacing with the virtual machine and a "Program" part which corresponds to the compiling of the code of the Application and implements its functions of the application.

To this end, the method of the invention compiles the Application in native code and then makes it a Library proposing the same functions. According to the invention, this library can be responsible for two different techniques. The first technique consists in having the library loaded by the Application itself, i.e. a non-compiled part of the Application which is interpreted by the virtual machine and prompts the loading of the library by means of an appropriate library system call (for example for the virtual machine Dalvik, the "java.lang.System.loadLibrary" method). The second technique consists in using the system included in the terminal and loaded when the system starts up. In this latter case, all the applications of the terminal benefit from the acceleration of this library.

According to the invention, the library is accompanied by a link file which makes it possible to put the original JAVA™ methods into correspondence, each being represented by its full name (packet name, tracking of names of containing classes and then the names of the method with the type of these encoded programs) and the compiled code (i.e. the code contained in the Library represented by the symbol name) performing the same function. This file is used when initializing the Library.

In another alternative embodiment, a naming convention is used to obtain correspondence between the original JAVA™ methods and the compiled code (i.e. the code contained in the Library represented by a symbol) performing the same function algorithmically. It may be an internal identifier of the virtual machine. For example, the index of the method in the dex (Dalvik Executable) file compatible with a virtual Dalvik machine can serve as a method identifier to retrieve a symbol name in the Library. The symbol A is made to correspond with an index 1, the symbol B is made to correspond with an index 2 and so on and so forth. Any bijective encoding whatsoever of this internal information into symbol name is possible.

The Library obtained by the object of the invention is compatible with all the characteristics of the Dalvik virtual machine (dynamic loading of the classes, JNI code, garbage collector, exception, etc). Furthermore, the Library obtained by the object of the invention is non-intrusive in the Dalvik virtual machine since it re-utilizes the internal methods of the Dalvik virtual machine as well as its algorithms.

3. Calling Convention

The application compiled by the method that is the object of the invention uses the JNI calling convention. This convention is a superset of the C calling convention and therefore performs well. The JNI calling convention is a superset of the C calling convention chiefly because it dictates only one particular additional naming for the naming of the functions and the passage of an additional parameter representing the JNI environment. Consequently, the compiled Library can efficiently invoke JNI native code since it uses the same calling convention.

In another alternative, the Library compiled by the method that is the object of the invention could also use the calling convention of the Dalvik virtual machine. This machine is not compatible with the C calling convention. Therefore, if it is sought to use it optimally, the calling convention of the Dalvik virtual machine must be integrated into the compiler that is used to build the compiled Library. The LLVM compiler makes it possible, for example, to easily define its own calling convention and thus generate a code that is compatible with the virtual machine and shows better performance.

4. Initialization

During the initialization of the compiled Library, the processing operations described in the "linking" section (5.9) are executed. Then, the compiled code is installed in the Dalvik virtual machine. The installation of the compiled code is done by means of a linking file generated by the method that is an object of the invention during the compiling of the application. This file makes it possible to put the JAVA™ methods and the compiled code in correspondence.

One alternative to this technique consists in using an algorithmic putting into correspondence between the name of the JAVA™ method and the symbol corresponding to the compiled code.

During the installation of the compiled code in the Dalvik virtual machine, the descriptor of each compiled method is requested from the Dalvik virtual machine and then each descriptor is modified. The modifications make it possible to inform the Dalvik virtual machine:

that each invocation coming from a code not compiled by the method that is an object of the invention must invoke the "stub" (cf. section on "Stub" 5.5.) corresponding to this method. Specifically, a flag is used to indicate that the method is a native method and the function pointer is informed about this "stub". Thus, when the virtual machine wishes to invoke the compiled method, this method will invoke the stub which takes responsibility for converting the calling convention of the virtual machine into the calling convention of the compiled method (for example the JNI method).

of the address of the "C" function which will carry out the function of this method by means of a function pointer. Thus, the "stub" mentioned here above retrieves this address and can itself invoke this function when it has invoked the calling convention. However, it is also the case that the compiled code present in the Library can use this pointer to invoke another compiled method.

In the Android system, when this initialization is done in the application, only this application benefits from the compiled version of the library and is therefore accelerated.

However, when this initialization is done in the "Zygote" process, all the applications and services instantiated by this system will benefit from the compiled version of the Library and therefore the entire system is accelerated. Indeed, the "Zygote" process uses the "fork" technique to launch a novel application. This technique enables a child process to inherit values in the memory of the parent process. Now, the initialization (which has just been described) modifies the descriptors of methods in memory before this "fork" system call. This initialization is therefore propagated to all the other applications and services of the system by memory inheritance.

5. Stub

Execution Stub of the Function

If the method that is an object of the invention uses the JNI calling convention, all the invocations of the Dalvik virtual machine towards the compiled code use the algorithm enabling a JNI method to be invoked. This algorithm is sometimes considered as not being always optimal because the Dalvik virtual machine must analyze the signature of the method invoked to determine the way in which to pass the parameters into the method and to do this at each invocation.

The runtime that is the object of the invention generates a stub for each method that it compiles because the method knows, offline, how the parameters must be passed. This stub is therefore invoked by the Dalvik virtual machine and then the stub invokes the compiled method by carrying out an optimal passing of parameters since the analysis of the signature is no longer necessary during the execution.

6. Field Access

The instance (or object) fields and the static fields are essential notions and are extremely used in the JAVA™ language. The accesses to these instance fields and these static fields use the same algorithms as the Dalvik virtual machine to obtain compatibility of the objects. The compatibility is important because the objects are accessed both by the non-compiled methods and by the compiled methods. These algorithms (in the form of specific native code) are included in the code generated by the method that is an object of the invention in order to obtain optimum performance.

The instance fields are accessed by adding an "offset" to the address for the instance when the static fields are accessed directly by their address. The "linking" section (5.9) describes the possibilities for managing these offsets and these addresses.

7. Invocation of Methods

For the same reasons as those related to the accesses to the fields, the invocation of methods uses the algorithms of the Dalvik virtual machine to obtain compatibility of the objects. These algorithms are also included in the code compiled by the method that is the object of the invention in order to obtain optimum performance.

The inclusion of algorithms in the code generated at the position of the invocation enables the use of specialized versions for this precise location and not generic versions for all the invocations. Thus, the code compiled by the method that is the object of the invention avoids analysis of the signature of the method invoked and directly copies the parameters because, at this location, the parameters of the method called are known during the compilation. On the contrary, the generic code of the Dalvik virtual machine must analyze the signature of the method invoked in order to decide how a parameter has to be copied depending on its type, because this generic code is executed whatever the method called.

The method that is an object of the invention optimizes certain invocations when the invoked method can be determined offline and when the invoked method is also compiled. Thus, by analysis, the compilation method notes that an invocation is obtained constantly at a given location of the code. For example, this is the case for an invocation which is not of a virtual type (hence of a static type or a private method type) or else one that cannot be defined (final method or class of the JAVA™ language). These invocations can then be replaced by a direct invocation, i.e. by a simple "C" function call compiled in the library.

The invocation algorithms of the Dalvik virtual machine can use the addresses or else offsets to represent the invoked methods. The "linking section" describes the possibilities for managing these offsets and addresses.

8. Other Access Mechanisms

More generally, all the other mechanisms (access to the tables, creation of objects, verification of types, etc) are managed identically with the fields and with the invocations of methods, namely:
- if the operation is frequent, the algorithm of the Dalvik virtual machine is used but its code is generated directly in the target code (inline mechanism) and specialized as a function of the calling context known offline (for example a type check can be optimized because the compiler knows whether the type is a table or an object and therefore the check is optimized as a function of this context known offline);
- if the operation is not frequent, the code of the Dalvik virtual machine is called directly, without precise optimization.

9. Linking

The method invocation and field access algorithms use "offsets" and/or addresses to represent the fields and methods used. The method that is the object of the invention offers three possibilities for managing these addresses and its offsets:
- by construction, the value of the offset used to represent a method or else a field is constant from one execution to another. The method that is the object of the invention can therefore retrieve their value by performing a first execution of the application, and then saving them in a file. This file is then used directly during the compilation of the optimized application in order to offer a maximum degree of opportunity of optimizations. These offsets can also be obtained by applying the same algorithms as the Dalvik virtual machine but in doing so offline and thus avoiding the first execution by which these offsets are retrieved.
- when an address representing a method or a field is not constant from one execution to another, the method that is an object of the invention adds an overall variable for saving each address representing a method or a field used by the application. These overall variables are initialized during the starting of the optimized application by interrogating the Dalvik virtual machine to obtain the value of these addresses. Subsequently, the compiled code uses these variables without re-interrogating the Dalvik virtual machine. These overall variables can also be used to save the value of the offsets representing a method or else a field and not use the first case.
- the last possibility enables the method that is an object of the invention to no longer use the overall variables to save the information of the Dalvik virtual machine. When the optimized application is loaded, a dynamic linking is obtained. This means that all the locations of the application in which an offset or an address are used are replaced by their corresponding value which, as in the second case, is known during the starting of the optimized application.

10. Garbage Collector

According to the known method, the compatibility of the JNI native code with the Garbage Collector of the Dalvik virtual machine is ensured by using a reference table of objects imported into the native world. Thus, the Garbage Collector can be activated in parallel in a secured way. It is enough for it to scan this table during its phase for determining root references. Each time that the Dalvik virtual machine is called by JNI native code, this table is updated as a function of the imported references.

For reasons of performance, the compatibility of the Garbage Collector of the Dalvik virtual machine is not ensured in the same way in the method that is the object of the invention. As a whole, this compatibility is closer to the way in which the Dalvik virtual machine manages the Garbage Collector during the code interpretation. The mechanism is as follows:
At the start of each method, the compiled method:
Checks that the Garbage Collector has not asked to be executed by reading the flag of the Dalvik virtual machine.
If the answer is yes, the compiled code calls a method of the Dalvik virtual machine to suspend itself and allow the Garbage Collector to be executed,
Indicates, by means of a status flag of the Dalvik virtual machine, that the Thread cannot be interrupted by the Garbage Collector.

Thus, the compiled code can use object references as it wishes without having to maintain a table. As a trade-off, before each calling of a method and before each creation of an object, the compiled code adds references of live objects in this table because the Garbage Collector can get activated equally well at the start of execution of a method (a mechanism described at the start of the section) as during the invocation of an interpreted message, as also during the creation of an object.

To generate the compiled code which adds the references of live objects, the compiler computes the live variables potentially containing references. It then sends out a series of instructions which add their content (the content of the live variables) to the table of local references of the Dalvik virtual machine. It must be noted that it thus knows the maximum of the live variables that it will add during the lifetime of the method and thus it can generate a verification of the space available in the table at the start of execution of the method.

Moreover, in certain program portions containing computation loops without any calling of methods, the compiler can insert a possible suspension point for the Garbage Collector. This suspension point is a point in the program where the Garbage Collector is entitled to get executed. To this end, it sequentially generates code which:

- adds the live references into the table of the overall references,
- verifies that the Garbage Collector has not asked to get executed by reading a flag of the Dalvik virtual machine,
- if the answer is yes, calls a method of the Dalvik virtual machine to suspend itself and allow the Garbage Collector to run,
- indicates, by means of a status flag of the Dalvik virtual machine, that the Thread cannot be interrupted by the Garbage Collector,
- withdraws the previously added references.

11. Management of Runtime Exceptions

The C++ exceptions of the Android runtime are not available in all the versions. Furthermore, the C++ exceptions do not perform as well as desired. The compiler must therefore manage a system of exception in C. Classically, in known implementations, a system for capturing/restoring the runtime context by means of setjump/longjump standard library functions is set up. Such a system has a prohibitive cost of saving and restoring complete states of the processor because this mechanism is generic and should be capable of being suited to any C program.

The method that is the object of the invention uses a mechanism that is less costly and is compatible with the Dalvik virtual machine. Indeed, this virtual machine possesses a field in its TLS (Thread Local Storage) space containing the JAVA™ object which is launched through an exception. The method that is an object of the invention comprises the insertion of code which makes it possible, when an exception is raised in the compiled code, for this field to be allocated the reference of the object to be launched and then enables branching to the code that is processing this exception (either the default try/catch block or the try/catch block defined in the compiled method and managing this exception). If the method returns to the interpreter of the Dalvik virtual machine, it will verify whether there is an exception pending and will carry out the appropriate processing operation.

Thus, during the compilation, the method that is an object of the invention will insert, into each method, a default try/catch block covering the entire code of the method, the processing of this try/catch block being a simple return of method. If the method must return a value, it returns an arbitrary value. As an alternative, this default try/catch mechanism can be directly replaced by a return to all the places of the code branching to this default try/catch block.

The method that is the object of the invention also inserts a label at the end of the compiled method and for each try/catch block encountered in this method. This label is followed by a code which decodes according to the type of the exception object (corresponding to the type of each catch block of the same try block) and carries out the appropriate processing associated with this catch block. It adds a code which branches to the higher try/catch block (i.e. the nearest one) if the decoding as a function of the type of object has not found a corresponding type.

The method that is an object of the invention generates code which, after each instruction capable of potentially activating or else propagating an exception (throw, invocation, table access, etc) verifies that there is an exception pending. If the answer is yes, the method that is the object of the invention inserts a branching towards the label corresponding to the try/catch block closest to the invocation or else to the default try/catch block if no block has been defined in the compiled method.

Although the present disclosure has been described with reference to one or more examples, workers skilled in the art will recognize that changes may be made in form and detail without departing from the scope of the disclosure and/or the appended claims.

The invention claimed is:

1. A method for making available an application to a virtual machine, wherein the method comprises:
   identifying, by a processor, one or more sets of objects in an original code of the application, wherein an object includes a method;
   determining symbols in a native code associated with the virtual machine that correspond to methods of objects in the one or more sets of objects in the original code;
   generating respective function stubs for the methods of the objects, wherein a function stub of the respective function stubs marks a given method of the methods for compiling;
   based on the respective function stubs, compiling the original code into a native application having the native code for a platform associated with the virtual machine, wherein the native application includes a system for managing runtime exceptions associated with the methods of the objects and unused objects of the one or more sets of objects;
   converting, by the processor, the compiled native application into a library; and
   providing the library and the compiled native application to the virtual machine.

2. The method according to claim 1, wherein compiling the original code into the native application having the native code for the platform associated with the virtual machine further comprises:
   inserting a first set of specific native codes of access corresponding to one or more variables of the original code into the native code of the native application; and
   inserting a second set of specific native codes of invocation corresponding to respective methods of the objects of the original code into the native code of the native application.

3. The method according to claim 2, wherein the first set of specific native codes manage access to at least one field based on an offset of addresses in memory or a specific access address.

4. The method according to claim 2, wherein the second set of specific native codes manage access to at least one method of the application by at least one of: an offset of addresses in memory; or by means of a specific access address.

5. The method of claim 1, wherein determining symbols in the native code associated with the virtual machine that correspond to methods of objects in the one or more sets of objects in the original code comprises:

selecting the native code for the native application based on a platform associated with the virtual machine.

6. The method of claim 1, wherein a respective function stub of the function stubs signals a given method for compiling into the native application having the native code.

7. The method of claim 1, wherein compiling the native application comprises:

compiling a portion of the original code into the native code of the native application.

8. The method of claim 1, further comprising:

generating function stubs for one or more methods of respective objects, wherein a given function stub identifies a given method for compiling into the native code; and wherein compiling the original code into the native application further comprises:

compiling the methods having function stubs into the native code of the native application.

9. The method of claim 1, wherein compiling the original code into the native application includes inserting one or more data structures configured to enable the virtual machine to execute the native application.

10. A method for making an application available to a virtual machine comprising:

compiling, with a processor, an application written in an original code into a native application for a considered platform, wherein compiling the application written in the original code into the native application comprises:

analyzing the original code of the application, delivering at least one set of objects of the application and at least one set of variables of the application to the virtual machine, an object of the set of objects comprising at least one associated method;

placing at least one method of an object of the set of objects in correspondence with a corresponding symbol in a native code of the native application, as a function of the set of objects;

generating a function stub for each method to be compiled, according to the set of objects;

creating the native application according to the placing in correspondence and the generation of the function stub;

generating a mechanism for managing runtime exceptions within the at least one method of objects belonging to the set of objects; and inserting a specific mechanism for managing objects not used by the virtual machine; and converting, with the processor, the compiled native application into the library, and making the library available to the virtual machine.

11. A device for making available an application to a virtual machine, wherein the device comprises:

one or more processors;

a memory having stored thereon instructions that, upon execution by the one or more processors, cause the device to perform functions comprising:

identifying one or more sets of objects in an original code of the application, wherein an object includes a method;

determining symbols in a native code associated with the virtual machine that correspond to methods of objects in the one or more sets of objects in the original code;

generating respective function stubs for the methods of the objects, wherein a function stub of the respective function stubs marks a given method of the methods for compiling;

based on the respective function stubs, compiling the original code into a native application having the native code for a platform associated with the virtual machine, wherein the native application includes a system for managing runtime exceptions associated with the methods of the objects and unused objects of the one or more sets of objects;

converting the compiled native application into a library; and providing the library and the compiled native application to the virtual machine.

12. The device of claim 11, wherein identifying, by the processor, the one or more sets of objects in the original code of the application includes identifying one or more variables in the original code of the application.

13. The device of claim 11, wherein determining symbols in the native code associated with the virtual machine that correspond to methods of objects in the one or more sets of objects in the original code comprises:

selecting the native code based on a platform associated with the virtual machine.

14. The device of claim 11, wherein compiling the original code into the native application having the native code for the platform associated with the virtual machine is based on the determined symbols in the native code that correspond to the methods of the objects in the one or more sets of objects in the original code.

15. The device of claim 11, wherein compiling the native application comprises:

compiling a portion of the original code into the native code of the native application.

16. A non-transitory computer-readable storage device comprising a computer program product stored thereon and executable by a data processor, the product comprising program code instructions for executing a method for making available an application to a virtual machine when the instructions are executed by the processor, wherein the method comprises:

identifying one or more sets of objects in an original code of the application, wherein an object includes a method;

determining symbols in a native code associated with the virtual machine that correspond to methods of objects in the one or more sets of objects in the original code;

generating respective function stubs for the methods of the objects, wherein a function stub of the respective function stubs marks a given method of the methods for compiling;

based on the respective function stubs, compiling the original code into a native application having the native code for a platform associated with the virtual machine, wherein the native application includes a system for managing runtime exceptions associated with the methods of the objects and unused objects of the one or more sets of objects;

converting the compiled native application into a library; and providing the library and the compiled native application to the virtual machine.

17. The non-transitory computer-readable storage device of claim 16, wherein the library enables the virtual machine to execute the compiled native application.

18. The non-transitory computer-readable storage device of claim 16, wherein the library includes one or more links corresponding to the methods of objects compiled in the native application.

19. The non-transitory computer-readable storage device of claim 16, wherein compiling the original code into the native application having the native code for the platform associated with the virtual machine comprises:
   compiling the native application to include access to one or more tables associated with the original code.

20. The non-transitory computer-readable storage device of claim 16, wherein converting the compiled native application into the library comprises:
   generating one or more links between one or more portions of the native code of the native application and one or more portions of the original code of the application; and
   inserting the one or more links into the library.

* * * * *